United States Patent
Hayaki et al.

(10) Patent No.: US 12,340,002 B2
(45) Date of Patent: Jun. 24, 2025

(54) MONITORING RANGE DETERMINATION DEVICE, MONITORING RANGE DETERMINATION METHOD, AND COMPUTER READABLE MEDIUM

(71) Applicant: NEC Corporation, Tokyo (JP)

(72) Inventors: Yuto Hayaki, Tokyo (JP); Norio Yamagaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 159 days.

(21) Appl. No.: 18/032,110

(22) PCT Filed: Oct. 28, 2020

(86) PCT No.: PCT/JP2020/040339
§ 371 (c)(1),
(2) Date: Apr. 14, 2023

(87) PCT Pub. No.: WO2022/091232
PCT Pub. Date: May 5, 2022

(65) Prior Publication Data
US 2023/0401339 A1    Dec. 14, 2023

(51) Int. Cl.
*G06F 21/64* (2013.01)
*G06F 21/12* (2013.01)

(52) U.S. Cl.
CPC .............. *G06F 21/64* (2013.01); *G06F 21/12* (2013.01)

(58) Field of Classification Search
CPC ................................. G06F 21/64; G06F 21/12
See application file for complete search history.

(56) References Cited

U.S. PATENT DOCUMENTS

| | | | |
|---|---|---|---|
| 6,829,710 B1 * | 12/2004 | Venkatesan | G06F 21/16 713/176 |
| 2003/0188231 A1 * | 10/2003 | Cronce | G06F 21/51 713/165 |

(Continued)

FOREIGN PATENT DOCUMENTS

WO    2018/150619 A1    8/2018

OTHER PUBLICATIONS

International Search Report for PCT Application No. PCT/JP2020/040339, mailed on Jan. 19, 2021.

(Continued)

*Primary Examiner* — Khalid M Almaghayreh

(57) ABSTRACT

A device includes: an input/output unit configured to receive input of the binary of the software to be monitored in which a tamper detection feature and tamper detection feature calling functions are embedded; a CFG (control flow graph) generation unit configured to generate a CFG based on the binary; and an allowed list creation unit configured to determine the monitoring range for the tamper detection feature calling functions based on the CFG. The allowed list creation unit sequentially selects the tamper detection feature calling functions on the CFG, adds a node to the monitoring range for the selected tamper detection feature calling functions according to a predetermined rule, searches for the tamper detection feature calling function to be be executed next to the added node according to the predetermined rule, and adds the found tamper detection feature calling function to the monitoring range for the selected tamper detection feature calling functions.

5 Claims, 12 Drawing Sheets

(56) References Cited

U.S. PATENT DOCUMENTS

| | | | |
|---|---|---|---|
| 2008/0184041 A1* | 7/2008 | Jakubowski | G06F 21/14 |
| | | | 726/22 |
| 2015/0240531 A1* | 8/2015 | Blust | G07C 9/00571 |
| | | | 340/5.5 |
| 2015/0269805 A1* | 9/2015 | Korala | G06F 21/83 |
| | | | 713/194 |
| 2015/0278511 A1* | 10/2015 | Foley | G06F 21/54 |
| | | | 726/23 |
| 2017/0024983 A1* | 1/2017 | Reeves | G08B 13/02 |
| 2017/0249456 A1* | 8/2017 | Fu | G06F 21/56 |
| 2018/0276374 A1* | 9/2018 | Baldwin | G06F 21/53 |
| 2020/0042695 A1* | 2/2020 | Kanei | G06F 21/64 |

OTHER PUBLICATIONS

Kobayashi, Toshiki et al., "SAFES: Sand-boxed Architecture for Frequent Environment Self-measurement", SysTEX 18: Proceedings of the 3rd Workshop on System Software for Trusted Execution, Oct. 15, 2018, pp. 1-5.

Hayaki, Yuto, "Proposal of proof of trust by tampering detection system for IoT devices", SCIS 2020, The Institute of Electronics, Information and Communication Engineers, Jan. 21, 2020, 2D1-4, pp. 1-6

NEC Digital Platform Operations, "Lightweight program tampering detection development kit for detecting unlawful manipulation of IoT devices", C&C User Forum & EXPO, Oct. 2019, pp. 1-2.

* cited by examiner

MONITORING RANGE DETERMINATION DEVICE, MONITORING RANGE DETERMINATION METHOD, AND COMPUTER READABLE MEDIUM

This application is a National Stage Entry of PCT/JP2020/040339 filed on Oct. 28, 2020, the contents of all of which are incorporated herein by reference, in their entirety.

TECHNICAL FIELD

The present disclosure relates to a monitoring range determination device that determines the monitoring range to be monitored by tamper detection feature calling functions that call a tamper detection feature, a monitoring range determination method, and a computer readable medium, and in particular, to a monitoring range determination device for use in software for devices such as Internet of Things (IoT) devices, a monitoring range determination method, and a computer readable medium.

BACKGROUND ART

With the recent proliferation of IoT devices, there is a demand for security systems that can operate even in devices that do not have ample resources such as memory and CPU (Central Processing Unit), such as IoT devices.

As a related security system, a method is known in which an allowed list type tamper detection feature using hash values is embedded in a device to monitor whether the software on the device is in a correct state (whether it has been tampered with or not).

An allowed list type tamper detection feature using hash values is a feature of monitoring for tampering by registering information in a memory of a device in normal operation in advance in an allowed list, and comparing the information in the memory of the device in operation with the information in the memory registered in the allowed list. At this time, the information in the memory is managed in the form of hash values.

The allowed list type tamper detection feature using hash values is realized as follows. First, information in the memory of a device in normal operation is acquired in advance by some method, and the acquired information in the memory is registered in the allowed list. The information in the memory will be information on how the executable code is expanded on the memory. Next, the information in the memory is acquired at any timing during the operation of the device, and the acquired information in the memory is compared with the information in the memory registered in the allowed list. As a result of the comparison, if the information in the memory acquired during the operation of the device and the information in the memory registered in the allowed list match, there is no tampering (no attack), while if they do not match, the device has been tampered with (attacked).

The meaning of the allowed list is that it is a snapshot of a memory in normal operation. However, registering and comparing snapshots of memory in the form of hash values has less impact on the original operation of the device than registering and comparing snapshots of memory in their original form. Therefore, information in the memory in normal operation is registered in the allowed list in the form of hash values, and information in the memory in operation is also managed in the form of hash values. Examples of the allowed list type tamper detection feature using hash values are disclosed in Non Patent Literatures 1 and 2.

Non Patent Literature 1 discloses a method for detecting tampering with the next feature to be executed, triggered by an input to the device. According to the method of Non Patent Literature 1, user input is managed using TrustZone, which is a type of Trusted Execution Environment (TEE), which is an area whose security is guaranteed by a hardware feature. The user input determines the next feature to be executed (herein referred to as a feature A). User input also invokes tamper detection feature calling functions that calls the tamper detection feature. The tamper detection feature calling functions call the tamper detection feature and monitors for tampering, limited to the memory area used when executing the feature A. Both the tamper detection feature and the tamper detection feature calling functions are disposed in TrustZone.

Non Patent Literature 2 discloses a method aiming at faster monitoring than the method in Non Patent Literature 1 by setting the monitoring range in one time as one node of a control flow graph (CFG). Here, the CFG is a graph indicating in which order the program is executed. Thus, the CFG is a directed graph. The nodes of the CFG become the executable code of successive programs. At this time, one node of the CFG is separated into blocks for each branch instruction, and these blocks are called basic blocks. That is, one node of the CFG is one basic block.

Here, examples of the source code and the CFG will be described with reference to FIG. 1. The right side of FIG. 1 illustrates the source code, and the left side of FIG. 1 illustrates the CFG generated based on the binary built from the source code on the right. The numbers in each node on the left side of FIG. 1 indicate the line number of the source code on the right side, indicating that each node contains the executable code corresponding to the line number indicated by the number in each node. For example, node 2 contains an executable code corresponding to the lines 6 and 7 of the source code.

Non Patent Literature 2 discloses a method for embedding tamper detection feature calling functions for monitoring the executable codes of nodes in the source code describing the original operation of the device based on the CFG.

Patent Literature 1 discloses a method for embedding a tamper detection feature directly in a byte code. According to the method for Patent Literature 1, a CFG is created for each function for the program in which the tamper detection feature is to be embedded. Then, nodes are randomly extracted for each function based on the CFG, and the tamper detection feature is embedded in the extracted nodes and the nodes that are always executed before that.

CITATION LIST

Patent Literature

Patent Literature 1: International Patent Publication No. WO2018/150619

Non Patent Literature

Non Patent Literature 1: Toshiki Kobayashi, Takayuki Sasaki, Astha Jada, Daniele E. Asoni, Adrian Perrig, "SAFES: Sand-boxed Architecture for Frequent Environment Self-measurement", Proceedings of the 3rd Workshop on System Software for Trusted Execution, 2018, pp. 37-41

Non Patent Literature 2: Yuto Hayaki, Takayuki Sasaki, Sempei Liu, Mitsuteru Tomita, and Norio Yamagaki, "Proposal of Proof of Trust Technology with tamper detection Feature for IoT Devices," SCIS2020, 2020, pp. 1-6

SUMMARY OF INVENTION

Technical Problem

As described above, in the method of Non Patent Literature 1, the tamper detection feature calling functions are disposed in TrustZone together with a tamper detection feature. Therefore, in the method of Non Patent Literature 1, the safety of the tamper detection feature calling functions is guaranteed.

On the other hand, in the method of Non Patent Literature 2, the tamper detection feature calling functions are embedded in a source code. In addition, in the method of Patent Literature 1, not only the tamper detection feature but also the tamper detection feature calling functions are assumed to be embedded in a program.

However, when the tamper detection feature calling functions are embedded in the same memory area as the original program of the device, as in the methods of Non Patent Literature 2 and Patent Literature 1, the tamper detection feature calling functions themselves may be tampered with by an attacker.

Here, an example of a CFG in which tamper detection feature calling functions are embedded is described with reference to FIG. 2. FIG. 2 illustrates the CFG generated based on a binary built from a source code in which tamper detection feature calling functions are embedded in the source code in FIG. 1. In the example in FIG. 2, the tamper detection feature calling functions (hereinafter referred to as hooks as appropriate) H1, H2, H4, H5, and H6 are embedded at the beginning of nodes 1, 2, 4, 5, and 6, respectively, but they may be embedded in the middle of the nodes 1, 2, 4, 5, and 6 or as independent nodes immediately before each node.

In the methods of Non Patent Literature 2 and Patent Literature 1, the tamper detection feature calling functions are embedded in the executable code in the same memory area as the original program of the device, as in the example in FIG. 2. In this case, the tamper detection feature calling functions themselves may be tampered with by an attacker. Therefore, the tamper detection feature calling functions themselves must also be monitored.

However, neither Non Patent Literature 2 nor Patent Literature 1 mentions that the tamper detection feature calling functions themselves may be tampered with by an attacker. Therefore, there is no disclosed method for monitoring the tamper detection feature calling functions themselves.

Therefore, in view of the above-described problems, an object of the present disclosure is to provide a monitoring range determination device, a monitoring range determination method, and a computer readable medium that can determine the monitoring range for tamper detection feature calling functions so that the tamper detection feature calling functions themselves can be monitored.

Solution to Problem

A monitoring range determination device according to an aspect of the present disclosure is a monitoring range determination device configured to determine a monitoring range for tamper detection feature calling functions that are embedded with a tamper detection feature in a software to be monitored, the monitoring range determination device including:
an input/output unit configured to receive input of a binary of the software in which the tamper detection feature and the tamper detection feature calling functions are embedded;
a CFG generation unit configured to generate a control flow graph (CFG) based on the binary; and
a monitoring range determination unit configured to determine the monitoring range for the tamper detection feature calling functions based on the CFG,
in which the monitoring range determination unit
sequentially selects the tamper detection feature calling functions on the CFG,
adds a node to the monitoring range for the selected tamper detection feature calling functions according to a predetermined rule, and
searches for the tamper detection feature calling function that may be executed next to the added node according to the predetermined rule, and adds the found tamper detection feature calling function to the monitoring range for the selected tamper detection feature calling functions.

A monitoring range determination method according to another aspect of the present disclosure is
a monitoring range determination method executed by a monitoring range determination device configured to determine a monitoring range for tamper detection feature calling functions that are embedded with a tamper detection feature in a software to be monitored, the monitoring range determination method including:
an input step of inputting a binary of the software in which the tamper detection feature and the tamper detection feature calling functions are embedded;
a CFG generation step of generating a control flow graph (CFG) based on the binary; and
a monitoring range determination step of determining the monitoring range for the tamper detection feature calling functions based on the CFG,
in which the monitoring range determination step includes
sequentially selecting the tamper detection feature calling functions on the CFG,
adding a node to the monitoring range for the selected tamper detection feature calling functions according to a predetermined rule, and
searching for the tamper detection feature calling function that may be executed next to the added node according to the predetermined rule, and adding the found tamper detection feature calling function to the monitoring range for the selected tamper detection feature calling functions.

A computer readable medium according to yet another aspect of the present disclosure is
a non-transitory computer readable medium storing a program that causes a computer to execute processing of determining a monitoring range for tamper detection feature calling functions that are embedded with a tamper detection feature in a software to be monitored, the program including:
an input step of inputting a binary of the software in which the tamper detection feature and the tamper detection feature calling functions are embedded;
a CFG generation step of generating a control flow graph (CFG) based on the binary; and
a monitoring range determination step of determining the monitoring range for the tamper detection feature calling functions based on the CFG, in which the monitoring range determination step includes
sequentially selecting the tamper detection feature calling
functions on the CFG,
adding a node to the monitoring range for the selected
tamper detection feature calling functions according to
a predetermined rule, and
searching for the tamper detection feature calling function
that may be executed next to the added node according
to the predetermined rule, and adding the found tamper
detection feature calling function to the monitoring
range for the selected tamper detection feature calling
functions.

Advantageous Effects of Invention

The effect of the above-described aspect is that the monitoring range for the tamper detection feature calling functions can be determined so that the tamper detection feature calling functions themselves can be monitored.

EXAMPLE EMBODIMENT

Figure 1:
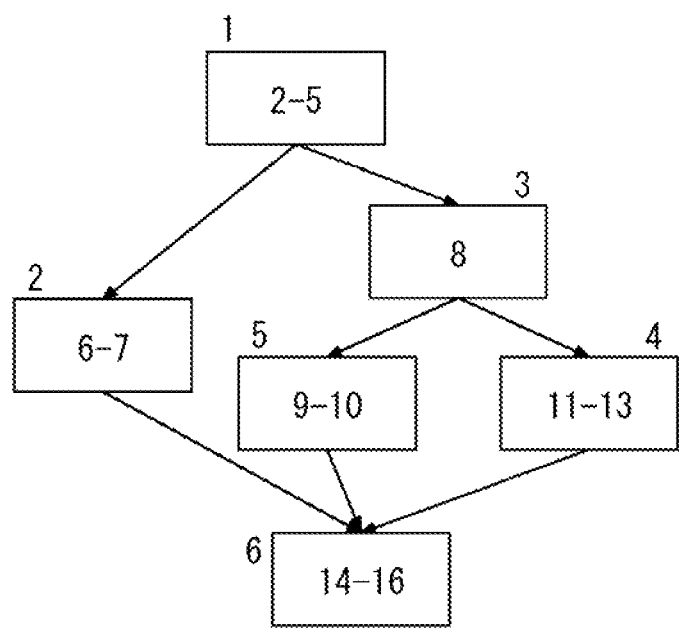
FIG. 1 illustrates an example of a source code and a CFG.
Figure 2:
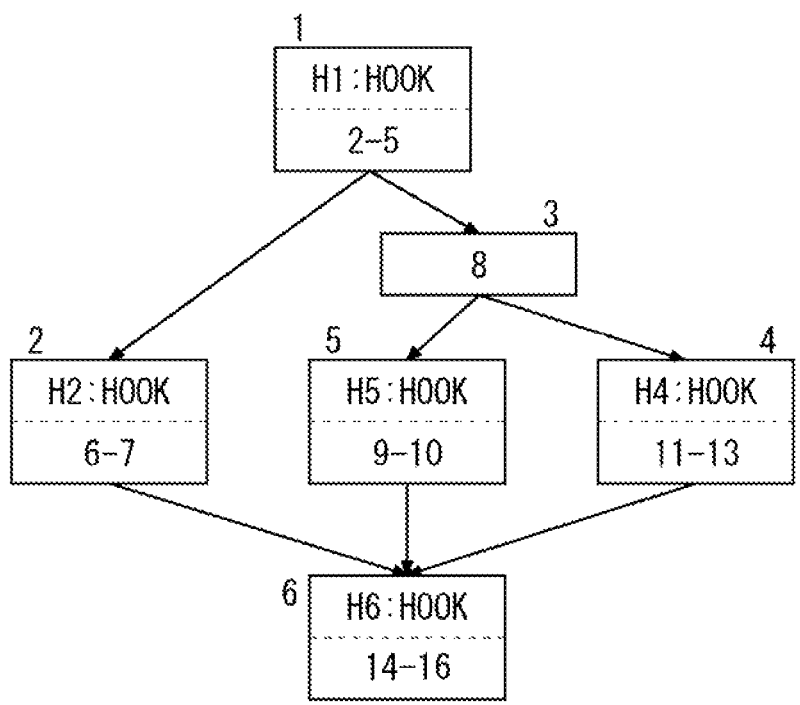
FIG. 2 illustrates an example of a CFG generated based on the source code in which tamper detection feature calling functions are embedded in the source code in FIG. 1.

Example embodiments of the present disclosure are described below with reference to the drawings. In the following example embodiments, identical or equivalent elements are denoted by the same reference numerals, and redundant descriptions will be omitted. The monitoring range determination device described in each of the following example embodiments are examples of devices that determines the monitoring range for tamper detection feature calling functions that are embedded with an allowed list type tamper detection feature using hash values for the software to be monitored.

First Example Embodiment

[Configuration of Example Embodiment 1]

Figure 3:
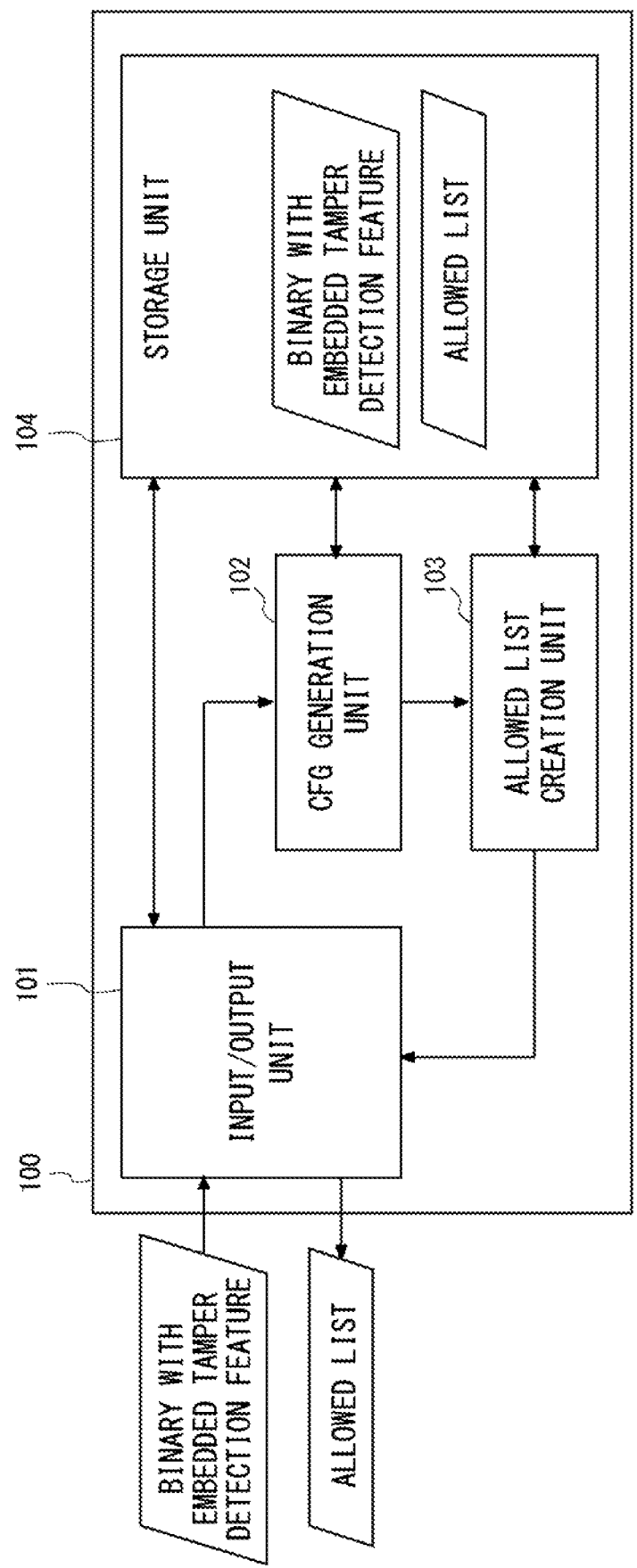
FIG. 3 is a block diagram illustrating an example of the configuration of a monitoring range determination device according to a first example embodiment.

First, an example of the configuration of a monitoring range determination device 100 according to the first example embodiment is described with reference to FIG. 3. In FIG. 3, unidirectional arrows indicate the direction of flow of certain data (or signals, information, and the like) in a straightforward manner and do not exclude bidirectionality (the same applies to FIGS. 9 and 12 below).

Referring to FIG. 3, the monitoring range determination device 100 according to the first example embodiment includes an input/output unit 101, a control flow graph (CFG) generation unit 102, an allowed list creation unit 103, and a storage unit 104. The input/output unit 101 is an example of an input unit, and the allowed list creation unit 103 is an example of a monitoring range determination unit.

Each of these components operates as follows

The input/output unit 101 receives input of a binary with embedded tamper detection feature, in which the tamper detection feature and the tamper detection feature calling functions are embedded in a binary of the software to be monitored (hereinafter referred to as the binary with embedded tamper detection feature). The software to be monitored is, for example, control software on IoT devices. The input/output unit 101 stores the input binary with embedded tamper detection feature in the storage unit 104 and sends a notification to the CFG generation unit 102 to execute processing.

When the input/output unit 101 receives the notification described below from the allowed list creation unit 103, it reads the allowed list described below from the storage unit 104 and outputs the read allowed list. However, the input/output unit 101 is not limited to reading the allowed list from the storage unit 104. The input/output unit 101 may receive the allowed list from the allowed list creation unit 103.

When the CFG generation unit 102 receives the notification from the input/output unit 101, it reads the binary with embedded tamper detection feature from the storage unit 104, analyzes the read binary with embedded tamper detection feature, and generates a CFG. The CFG generation unit 102 sends the generated CFG to the allowed list creation unit 103.

When the allowed list creation unit 103 receives the CFG from the CFG generation unit 102, it reads the binary with embedded tamper detection feature from the storage unit 104 based on the CFG. The allowed list creation unit 103 creates an allowed list based on the CFG and the binary with embedded tamper detection feature. The allowed list creation unit 103 stores the created allowed list in the storage unit 104 and sends a notification to the input/output unit 101 to execute processing.

The storage unit 104 stores the binary with embedded tamper detection feature from the input/output unit 101 and the allowed list from the allowed list creation unit 103.

The storage unit 104 is not an essential component of the monitoring range determination device 100, and may be provided outside of the monitoring range determination device 100. That is, the monitoring range determination device 100 may be realized with a minimum configuration consisting of the input/output unit 101, the CFG generation unit 102, and the allowed list creation unit 103.

[Operation of First Example Embodiment]

Figure 4:
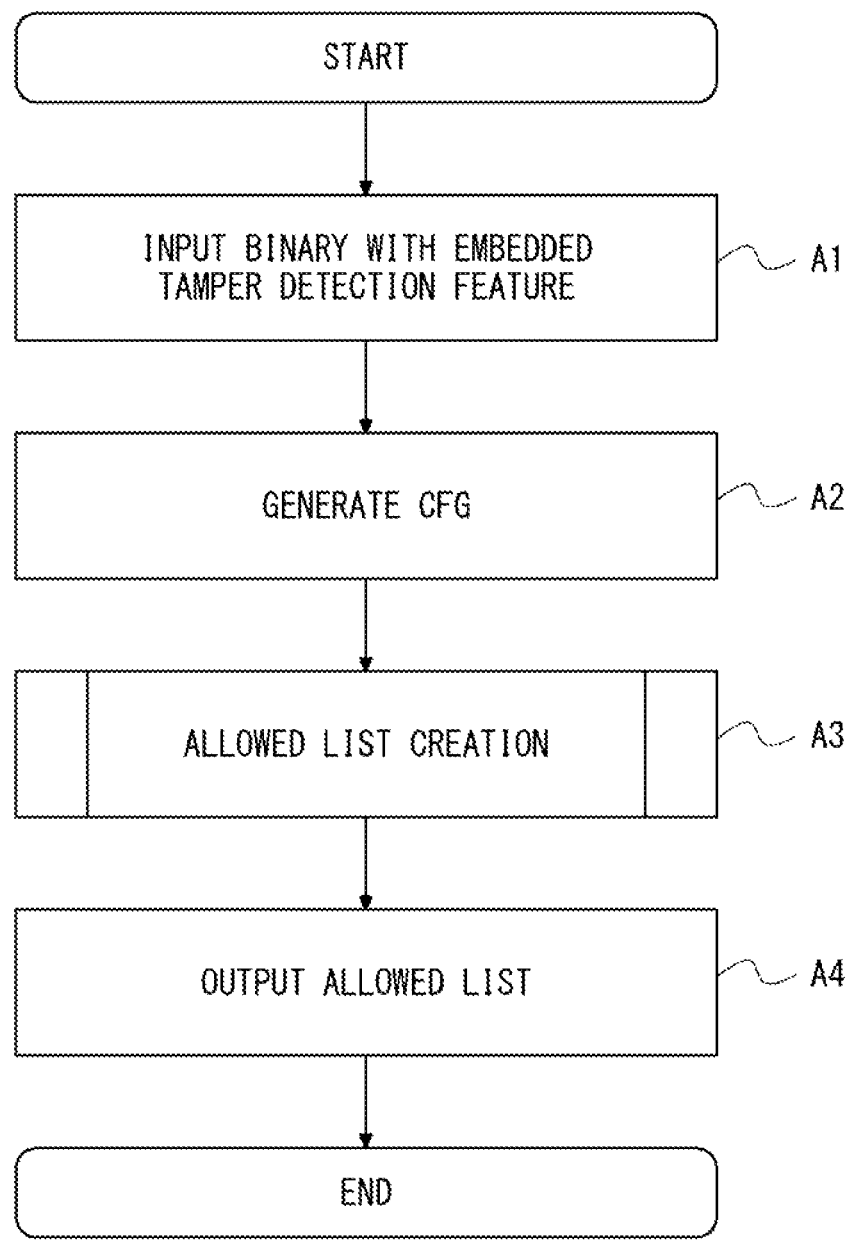
FIG. 4 is a flowchart illustrating an example of the overall operation of the monitoring range determination device according to the first example embodiment.

Next, with reference to the flowchart in FIG. 4, an example of the overall operation of the monitoring range determination device 100 according to the first example embodiment is described in detail.

Referring to FIG. 4, first, a binary with embedded tamper detection feature, in which the tamper detection feature and the tamper detection feature calling functions are embedded in a binary of the software to be monitored, is input to the input/output unit 101. The input/output unit 101 stores the input binary with embedded tamper detection feature in the storage unit 104 and sends a notification to the CFG generation unit 102 to execute processing (step A1).

When the CFG generation unit 102 receives the notification from the input/output unit 101, it reads the binary with embedded tamper detection feature input in step A1 from the storage unit 104, analyzes the read binary with embedded tamper detection feature, and generates a CFG. Furthermore, the CFG generation unit 102 sends the generated CFG to the allowed list creation unit 103 (step A2).

When the allowed list creation unit 103 receives the CFG generated in step A2 from the CFG generation unit 102, it reads the binary with embedded tamper detection feature from the storage unit 104 based on the received CFG. Furthermore, the allowed list creation unit 103 creates an allowed list based on the CFG and the binary with embedded tamper detection feature. Furthermore, the allowed list creation unit 103 stores the created allowed list in the storage unit 104 and sends a notification to the input/output unit 101 to execute processing (step A3). The details of step A3 are described later.

When the input/output unit 101 receives the notification from the allowed list creation unit 103, it reads the allowed list created in step A3 from the storage unit 104 and outputs the read allowed list (step A4).

Figure 5:
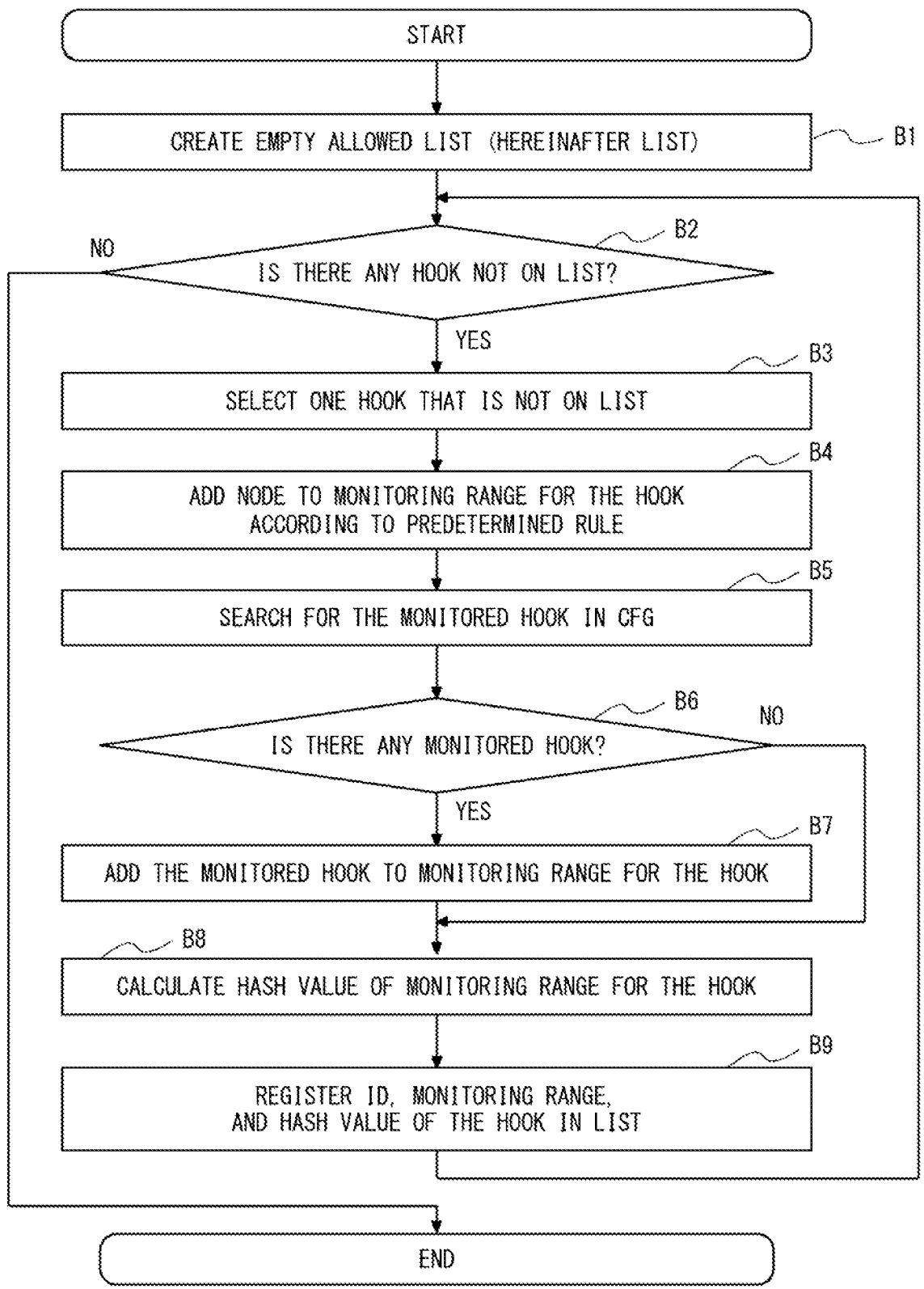
FIG. 5 is a flowchart illustrating an example of the operation executed by an allowed list creation unit according to the first example embodiment in step A3 in FIG. 4.
Figure 6:
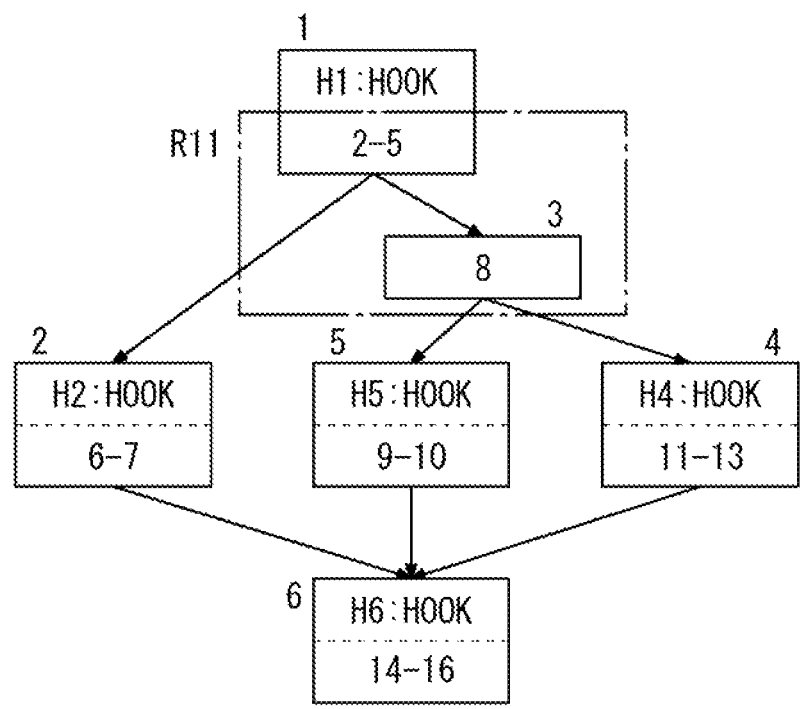
FIG. 6 is a diagram illustrating an example of a process in which the allowed list creation unit according to the first example embodiment determines the monitoring range for tamper detection feature calling functions in accordance with FIG. 5.
Figure 7:
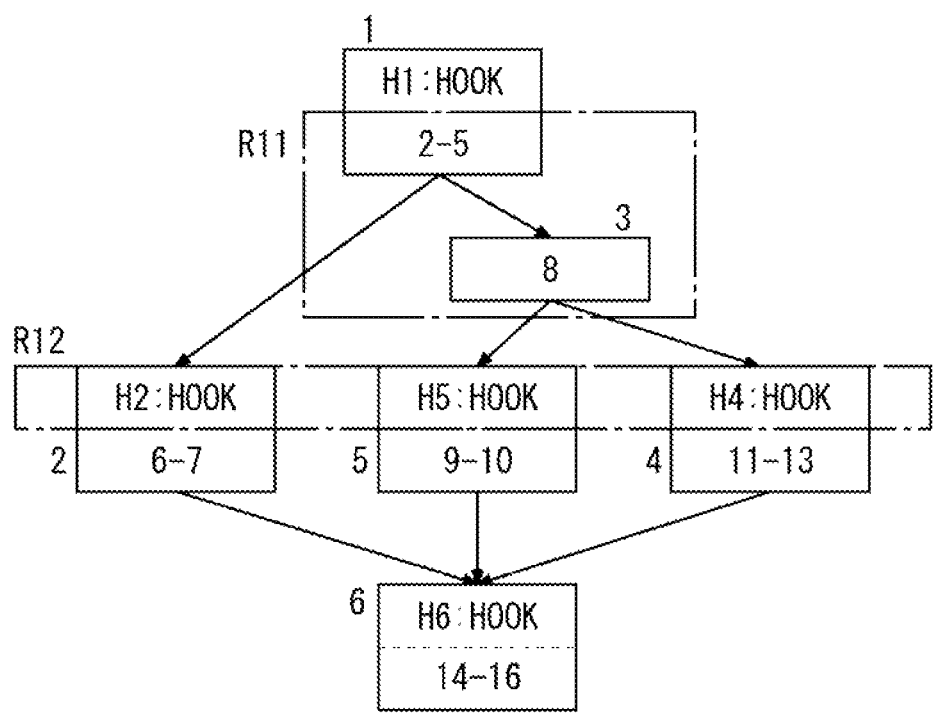
FIG. 7 illustrates an example of a process in which the allowed list creation unit according to the first example embodiment determines the monitoring range for tamper detection feature calling functions in accordance with FIG. 5.
Figure 8:
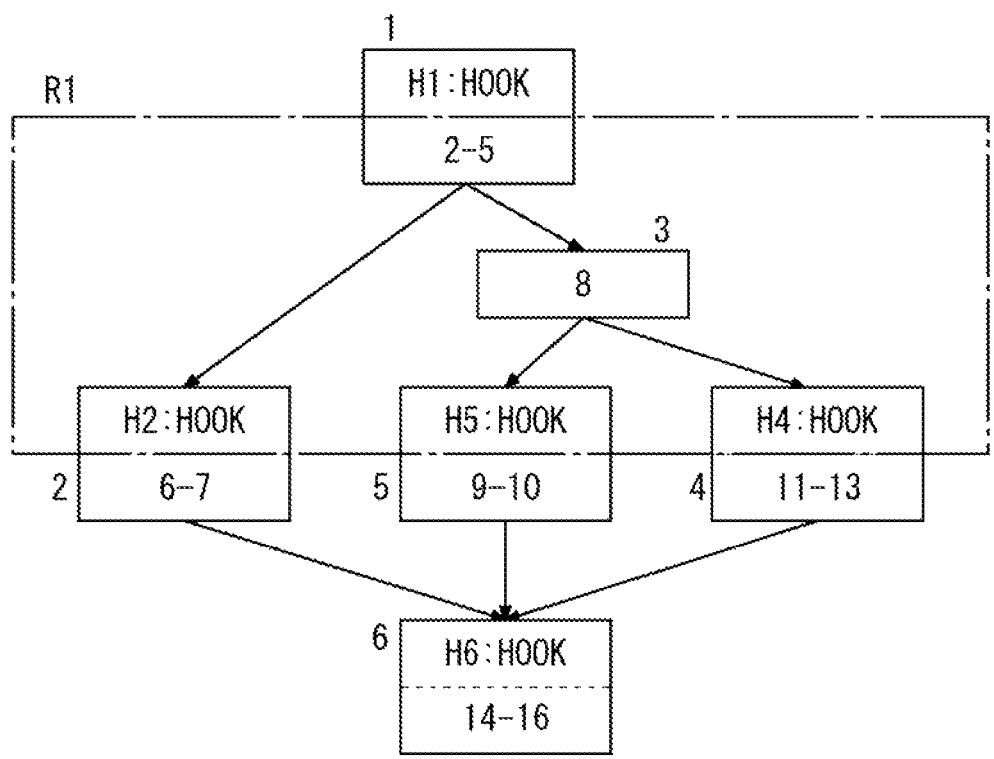
FIG. 8 is a diagram illustrating an example of a process in which the allowed list creation unit according to the first example embodiment determines the monitoring range for tamper detection feature calling functions in accordance with FIG. 5.

Next, with reference to the flowchart in FIG. 5, the operation executed by the allowed list creation unit 103 in step A3 in FIG. 4 is described in detail. This section also refers to FIGS. 6 to 8. FIGS. 6 to 8 illustrate an example of a process in which the allowed list creation unit 103 determines the monitoring range for tamper detection feature calling functions in accordance with FIG. 5. In FIGS. 6 to 8, as a premise, it is assumed that safety of the hook H1 at the beginning of the CFG is secured by secure boot or other means (the same applies to FIG. 11 below).

Referring to FIG. 5, when the allowed list creation unit 103 receives the CFG generated in step A2 from the CFG generation unit 102, it creates an empty allowed list (referred to as a list in step B2 and subsequent steps in FIG. 5) (step B1). Elements are added to the allowed list by executing the following steps B2 to B9.

First, the allowed list creation unit 103 determines whether or not a tamper detection feature calling function (herein referred to as a hook) that has not been added to the allowed list exists in the CFG generated in step A2 (step B2). If the corresponding hook exists (step B2 is YES), the process proceeds to step B3; if the corresponding hook does not exist (step B2 is NO), the allowed list creation unit 103 sends a notification to the input/output unit 101 and ends the process of step A3.

If the corresponding hook exists in step B2 (step B2 is YES), the allowed list creation unit 103 selects one hook from the corresponding hooks (step B3).

In the subsequent processing of steps B4 to B7, the monitoring range to be monitored by the hook selected in step B3 is determined. Here, a case where the allowed list creation unit 103 selects the hook H1 in FIGS. 6 to 8 as the hook in question will be described as an example.

First, the allowed list creation unit 103 adds a node to the monitoring range for the hook according to a predetermined rule (step B4). The predetermined rule may be, for example, a rule that adds a node to the monitoring range for the hook by the methods described in Non Patent Literature 2 and Patent Literature 1. Here, the predetermined rule shall be a rule that traces the nodes containing no hook among all the descendant nodes of the node containing the hook, and adds the range from the node containing the hook to the node immediately before the node containing the next hook to the monitoring range for the hook. In the example where the hook H1 is selected as the hook in question, the node containing the hook H1 is a node 1. Among the descendant nodes of the node 1, the node containing no hook is a node 3. Therefore, the allowed list creation unit 103 traces the node 3, but the nodes 4 and 5, which are child nodes of the node 3, contain hooks H4 and H5, respectively. Therefore, as illustrated in FIG. 6, the allowed list creation unit 103 adds the range R11, which includes the range after the hook H1 of the node 1 and the node 3, to the monitoring range for the hook H1.

Next, the allowed list creation unit 103 searches the CFG for the hook that may be executed next to the node added to the monitoring range for the hook in step B4 (hereinafter referred to as "monitored hook") (step B5).

Next, the allowed list creation unit 103 determines whether or not the monitored hook of the hook has been found (step B6). If the monitored hook is found (step B6 is YES), the process proceeds to step B7; if the monitored hook is not found (step B6 is NO), the process skips step B7 and proceeds to step B8. In the example where the hook H1 is selected as the hook in question, the allowed list creation unit 103 adds the range after the hook H1 of the node 1 and the node 3 to the monitoring range for the hook H1 in step B4 and FIG. 6. Therefore, the allowed list creation unit 103 first traces the node 1 to find the hook H2. Similarly, the allowed list creation unit 103 traces the node 3 to find the hooks H4 and H5. Therefore, the monitored hooks that may be executed in the range after the hook H1 of the node 1 added to the monitoring range for the hook H1 and after the node 3 are the hooks H2, H4, and H5. Therefore, in this example, the process proceeds to step B7.

If the monitored hooks for the hook are found in step B6 step (B6 is YES), the allowed list creation unit 103 adds all the found monitored hooks to the monitoring range for the hook (step B7). In the example where the hook H1 is selected as the hook in question, the allowed list creation unit 103 finds the hooks H2, H4, and H5 as monitored hooks for the hook H1 in step B5. Therefore, as illustrated in FIG. 7, the allowed list creation unit 103 adds the range R12 including the hooks H2, H4, and H5 to the monitoring range for the hook H1. The example illustrated here is that the hooks H2, H4, and H5 are at the beginning of the nodes 2, 5, and 4, respectively, but if each hook is in the middle of each node, the range R12 includes the range from the beginning of that node to the hook.

The processing of the above steps B4 to B7 determine the monitoring range for the hook selected in step B3. In the example where the hook H1 is selected as the hook in question, as illustrated in FIG. 8, the monitoring range for the hook H1 will eventually be the range R1 including the nodes 1, 3 and the hooks H2, H4, and H5 (in detail, the address range corresponding to the executable codes of the nodes 1 and 3 and the hooks H2, H4, and H5, the same applies hereinafter).

Next, the allowed list creation unit 103 calculates the hash value of the monitoring range for the hook, which has been determined by the processing of steps B4 to B7 (step B8). In the example where the hook H1 is selected as the hook in question, the monitoring range for the hook H1 is R1, which includes the nodes 1 and 3 and the hooks H2, H4, and H5, so the allowed list creation unit 103 calculates the hash value of this range R1.

Thereafter, the allowed list creation unit 103 registers the hook ID of the hook, the monitoring range for the hook, and the set of hash values of the monitoring range in the allowed list (step B9). After the processing of step B9 is completed, the process returns to step B2, and the allowed list creation unit 103 repeats the processing of steps B3 to B9 until the processing is executed for all hooks on the CFG generated in step A2.

In the above description, the hook H1 is selected as an example, but the allowed list creation unit 103 executes the same process for the hooks H2, H4, H5, and H6 on the CFG to determine the monitoring range.

Specifically, the allowed list creation unit 103 determines the monitoring range for the hook H2 to be the range after the hook H2 of the node 2 and including the hook H6, the monitoring range for the hook H4 to be the range after the hook H4 of the node 4 and including the hook H6, the monitoring range for the hook H5 to be the range to be the range after the hook H5 of the node 5 and including the hook H6, and the monitoring range for the hook H6 to be the range after the hook H6 of the node 6 and including the hook H6 of the node 6.

Here, for the hook H6, the hook cannot be found by tracing the node 6 containing the hook H6. Therefore, the allowed list creation unit 103 does not add hooks to the monitoring range for the hook H6.

Among the operations of the allowed list creation unit 103 in FIG. 5 described above, the operations up to the determination of the monitoring range for each hook on the CFG can be summarized as follows. The allowed list creation unit 103 selects hooks on the CFG sequentially and determines the monitoring range for the selected hooks. At this time, the allowed list creation unit 103 adds a node to the monitoring range for the selected hook according to a predetermined rule. Then, the allowed list creation unit 103 searches for the hook that may be executed next to the node added to the monitoring range for the selected hook, and adds the found hook to the monitoring range for the selected hook.

[Effect of First Example Embodiment]

Next, the effects of the monitoring range determination device 100 according to the first example embodiment will be described.

According to the first example embodiment, the allowed list creation unit 103 sequentially selects the tamper detection feature calling functions on the CFG. Then, the allowed list creation unit 103 adds a node to the monitoring range for the selected tamper detection feature calling functions according to the predetermined rule, searches for the tamper detection feature calling function that may be executed next to the added node, and adds the found tamper detection feature calling functions to the monitoring range for the selected tamper detection feature calling functions. Therefore, the monitoring range for the tamper detection feature calling functions can be determined so that the tamper detection feature calling functions themselves can be monitored. As a result, even when the tamper detection feature calling functions are embedded in the same memory area as the original program of the device, the tamper detection feature calling functions themselves can be monitored against tampering by an attacker.

Furthermore, according to the first example embodiment, the allowed list creation unit 103 can determine the monitoring range for the tamper detection feature calling functions simply by tracing the nodes on the CFG, thus allowing execution of mechanical processing.

Second Example Embodiment

The monitoring range determination device 100 according to the first example embodiment described above is configured on the assumption that when nodes are added to the monitoring range for the tamper detection feature calling functions on the CFG according to the predetermined rule, the nodes on the CFG are always added to the monitoring ranges for any of the tamper detection feature calling functions on the CFG.

On the other hand, the monitoring range determination device 200 according to the second example embodiment is configured so that there are nodes that are not added to any of the monitoring ranges for the tamper detection feature calling functions on the CFG (hereinafter referred to as nodes omitted from the monitoring range, as appropriate), even if nodes are added to the monitoring ranges for the tamper detection feature calling functions on the CFG according to the predetermined rule. For example, it is assumed that the predetermined rule is a rule that adds only the node containing a tamper detection feature calling function to the monitoring range for the tamper detection feature calling functions. In the case of these rules, in the examples in FIGS. 6 to 8, the only node to be added to the monitoring range for the hook H1 according to the predetermined rule is the node 1. As a result, the node 3 is not added to the monitoring range for any of the hooks H1 to H5 on the CFG and is a node omitted from the monitoring range.

[Configuration of Second Example Embodiment]

Next, an example of the configuration of the monitoring range determination device 200 according to the second example embodiment is described with reference to FIG. 9.

Figure 9:
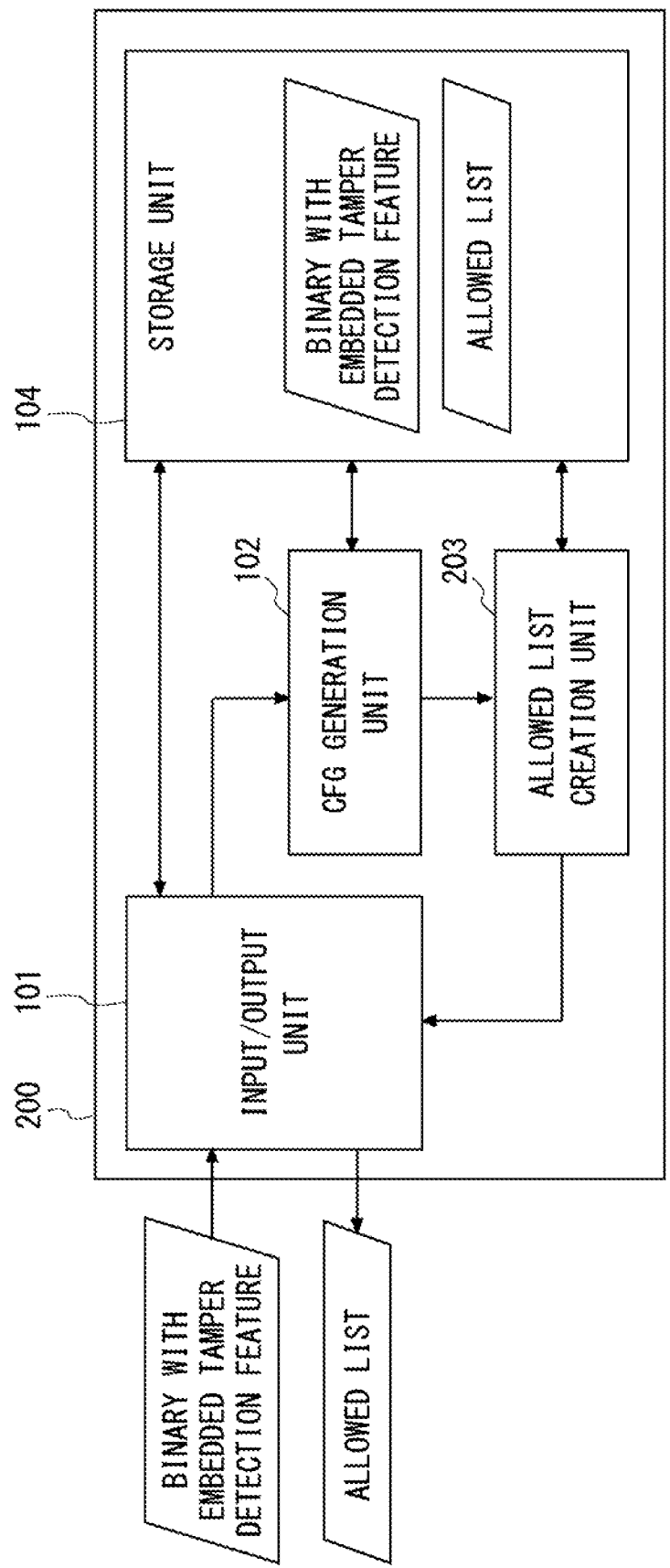
FIG. 9 is a block diagram illustrating an example of the configuration of a monitoring range determination device according to a second example embodiment.

Referring to FIG. 9, in the monitoring range determination device 200 according to the second example embodiment, the allowed list creation unit 103 in the monitoring range determination device 100 according to the first example embodiment described above is replaced by an allowed list creation unit 203. The configuration of the other parts of the monitoring range determination device 200 is the same as that of the monitoring range determination device 100, detailed description thereof will be omitted.

Similarly to the allowed list creation unit 103 according to the first example embodiment described above, the allowed list creation unit 203 according to the second example embodiment sequentially selects tamper detection feature calling functions on the CFG, adds nodes to the monitoring ranges for the selected tamper detection feature calling functions according to the predetermined rule, and searches for the tamper detection feature calling function that may be executed next to the added nodes. At this time, if the allowed list creation unit 203 finds a node that has not been added to the monitoring range for any of the tamper detection feature calling functions on the CFG by the time it finds the tamper detection feature calling function that may be executed next, the found node is also added to the monitoring range for the selected tamper detection feature calling functions.

[Operation of Second Example Embodiment]

The overall operation of the monitoring range determination device 200 according to the second example embodiment is the same as that of the monitoring range determination device 100 according to the first example embodiment described above in FIG. 4.

Figure 10:
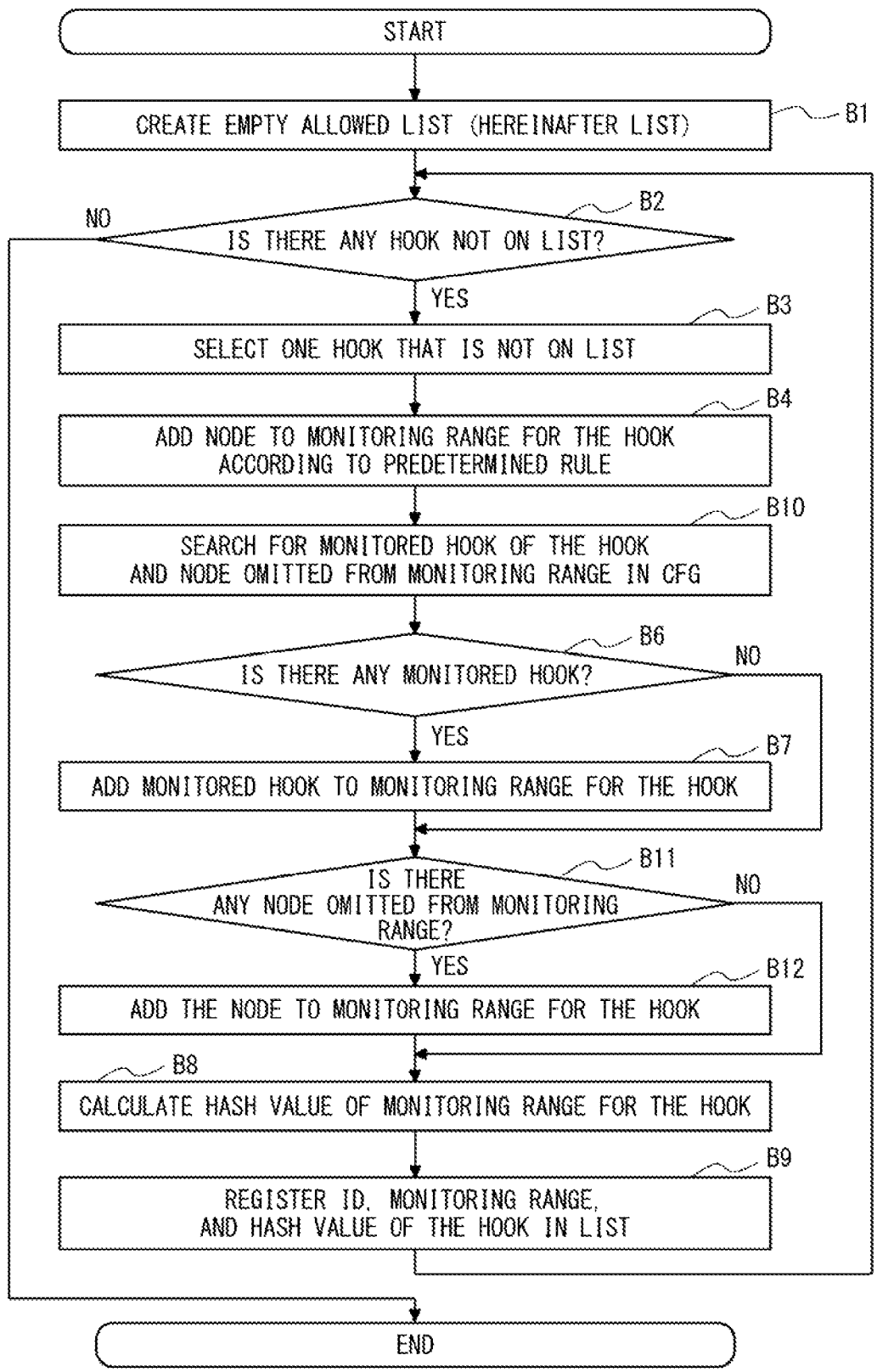
FIG. 10 is a flowchart illustrating an example of the operation executed by an allowed list creation unit according to the second example embodiment in step A3 in FIG. 4.
Figure 11:
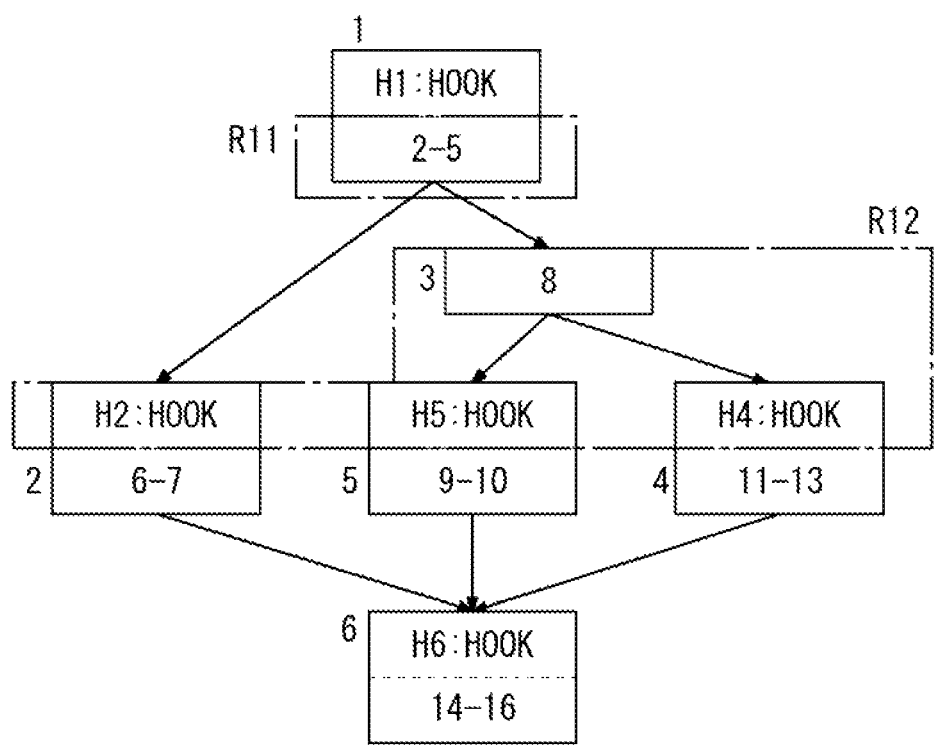
FIG. 11 illustrates an example of a process in which the allowed list creation unit according to the second example embodiment determines the monitoring range for tamper detection feature calling functions in accordance with FIG. 10.

Next, with reference to the flowchart in FIG. 10, the operation executed by the allowed list creation unit 203 in step A3 in FIG. 4 is described in detail. This section also refers to FIG. 11. FIG. 11 illustrate an example of a process in which the allowed list creation unit 203 determines the monitoring range for tamper detection feature calling functions in accordance with FIG. 10.

The operation of the allowed list creation unit 203 according to the second example embodiment is the same as the operation of the allowed list creation unit 103 according to the above-described first example embodiment in FIG. 5, except for the following operation. Here, a case where the allowed list creation unit 203 selects the hook H1 in FIG. 11 as the hook in question in step B3 will be described as an example.

In step B4, the allowed list creation unit 203 adds a node to the monitoring range for the hook according to a predetermined rule. Here, the predetermined rule shall be a rule that adds only the node containing the hook to the monitoring range for the hook. In the example where the hook H1 is selected as the hook in question, the node containing the hook H1 is a node 1. Therefore, as illustrated in FIG. 11, the allowed list creation unit 203 adds the range R11 including the node 1 to the monitoring range for the hook H1.

In step B10 executed after step B4, the allowed list creation unit 203 searches for the monitored hook of the hook in question in the CFG, and also searches for nodes that are omitted from the monitoring range until the monitored hook is found.

In step B11 executed after step B6 or step B7, the allowed list creation unit 203 determines whether any nodes that are omitted from the monitoring range have been found before the monitored hook for the hook in question is found. If a node omitted from the monitoring range is found (step B11 is YES), the process proceeds to step B12; if no node omitted from the monitoring range is found (step B11 is NO), the process skips step B12 and proceeds to step B8. In the example where the hook H1 is selected as the hook in question, the allowed list creation unit 203 adds the node 1 to the monitoring range for the hook H1 in step B4 and FIG. 11. Therefore, the allowed list creation unit 203 traces the node 1 to find the node 3 omitted from the monitoring range. Therefore, in this example, the process proceeds to step B12.

In step B12, which is executed when a node omitted from the monitoring range is found in step B11 (step B11 is YES), the allowed list creation unit 203 adds all the found nodes to the monitoring range for the hook. Thereafter, the process proceeds to step B8. In the example where the hook H1 is selected as the hook in question, the allowed list creation unit 203 finds the node 3 as a node that has been omitted from the monitoring range in step B10. Therefore, the allowed list creation unit 203 adds the node 3 to the monitoring range for the hook H1. In this example, the allowed list creation unit 203 also finds the hooks H2, H4, and H5 as monitored hooks for the hook H1 in step B10. Therefore, as illustrated in FIG. 11, the allowed list creation unit 103 adds the range R12 including the hooks H2, H4, and H5 and the node 3 to the monitoring range for the hook H1. As a result, in this example, the monitoring range for the hook H1 will eventually be the range R11 including the node 1 and the range R12 including the hooks H2, H4, and H5 and the node 3, as illustrated in FIG. 11.

[Effects of Second Example Embodiment]

Next, the effects of the monitoring range determination device 200 according to the second example embodiment will be described.

According to the second example embodiment, if the allowed list creation unit 203 finds one or more nodes that has not been added to the monitoring range for any of the tamper detection feature calling functions on the CFG before it finds the tamper detection feature calling function that may be executed next to the tamper detection feature calling function that has been added according to the predetermined rule, the found one or more nodes are added to the monitoring range for the selected tamper detection feature calling functions. Therefore, the monitoring range for the tamper detection feature calling functions can be determined so that nodes that are omitted from the monitoring range can also be monitored.

Other effects of the second example embodiment are the same as those of the first example embodiment described above.

Third Example Embodiment

The monitoring range determination device 100 according to the first example embodiment described above is configured to receive an input of a binary with embedded tamper detection feature, in which a tamper detection feature and tamper detection feature calling functions are embedded in the binary of a software to be monitored.

On the other hand, the monitoring range determination device 300 according to the third example embodiment is configured to receive input of a source code of the software to be monitored and also execute processing of embedding a tamper detection feature and tamper detection feature calling functions in the input source code.

[Configuration of Third Example Embodiment]

Next, an example of the configuration of the monitoring range determination device 300 according to the third example embodiment is described with reference to FIG. 12.

Figure 12:
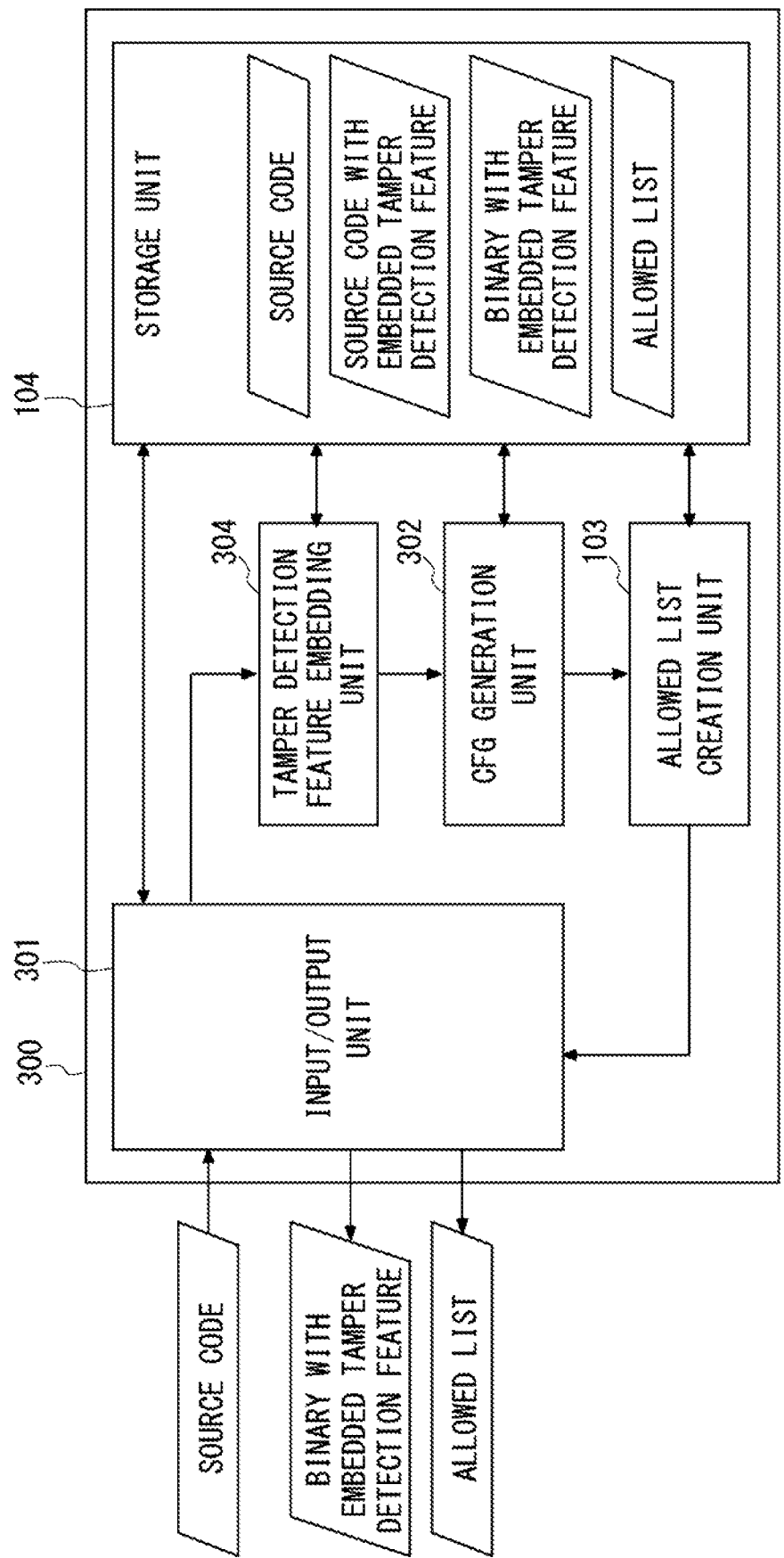
FIG. 12 is a block diagram illustrating an example of the configuration of a monitoring range determination device according to a third example embodiment.

Referring to FIG. 12, in the monitoring range determination device 300 according to the third example embodiment, the input/output unit 101 and the CFG generation unit 102 in the monitoring range determination device 100 according to the first example embodiment described above are replaced by an input/output unit 301 and a CFG generation unit 302, respectively, and a tamper detection feature embedding unit 304 is added. The configuration of the other parts of the monitoring range determination device 300 is the same as that of the monitoring range determination device 100, detailed description thereof will be omitted.

The input/output unit 301 according to the third example embodiment receives input of a source code of the software to be monitored. The input/output unit 301 stores the input source code in the storage unit 104 and sends a notification to the tamper detection feature embedding unit 304 to execute processing.

When the input/output unit 301 receives the notification from the allowed list creation unit 103, it reads from the storage unit 104 the binary with embedded tamper detection feature and the allowed list, and outputs the read binary with embedded tamper detection feature and the allowed list. However, the input/output unit 301 is not limited to reading the binary with embedded tamper detection feature and the allowed list from the storage unit 104. The input/output unit 301 may receive the binary with embedded tamper detection feature from the CFG generation unit 302, and the allowed list from the allowed list creation unit 103.

When the tamper detection feature embedding unit 304 according to the third example embodiment receives the notification from the input/output unit 301, it reads the source code from the storage unit 104 and embeds the tamper detection feature and the tamper detection feature calling functions in the read source code. The tamper detection feature embedding unit 304 stores the source code in which the tamper detection feature and the tamper detection feature calling functions are embedded (hereinafter referred to as the source code with embedded tamper detection feature) in the storage unit 104 and sends a notification to the CFG generation unit 302 to execute processing.

In the tamper detection feature embedding unit 304, any method may be used to embed the tamper detection feature and the tamper detection feature calling functions in the source code. For example, for the method for embedding the tamper detection feature calling functions, the tamper detection feature embedding unit 304 may request the CFG generation unit 302 to generate a CFG, determine the embedding points to embed the tamper detection feature calling functions in the source code based on the CFG, and embed the tamper detection feature calling functions at the determined embedding points.

When the CFG generation unit 302 according to the third example embodiment receives the notification from the tamper detection feature embedding unit 304, it reads the source code with embedded tamper detection feature from the storage unit 104, and builds it. The CFG generation unit 302 stores the binary with embedded tamper detection feature generated by the build in the storage unit 104. Furthermore, the CFG generation unit 302 analyzes the binary with embedded tamper detection feature to generate a CFG, and sends the generated CFG to the allowed list creation unit 103.

[Operation of Third Example Embodiment]

Figure 13:
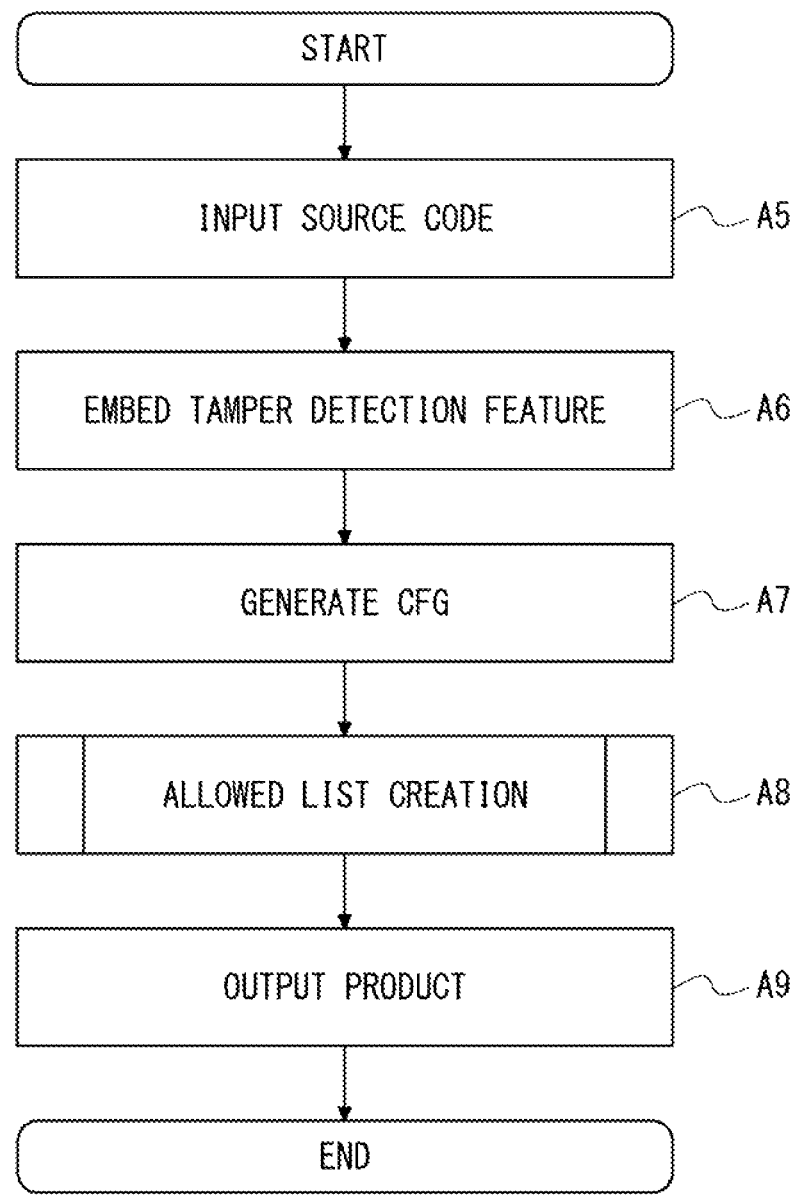
FIG. 13 is a flowchart illustrating an example of the overall operation of the monitoring range determination device according to the third example embodiment.

Next, with reference to the flowchart in FIG. 13, an example of the overall operation of the monitoring range determination device 300 according to the third example embodiment is described in detail.

Referring to FIG. 13, first, the input/output unit 301 receives input of a source code of the software to be monitored. The input/output unit 301 stores the input source code in the storage unit 104 and sends a notification to the tamper detection feature embedding unit 304 to execute processing (step A5).

When the tamper detection feature embedding unit 304 receives the notification from the input/output unit 301, it reads the source code input in step A5 from the storage unit 104, embeds the tamper detection feature and the tamper detection feature calling functions in the read source code, and generates a source code with embedded tamper detection feature. Furthermore, the tamper detection feature embedding unit 304 stores the source code with embedded tamper detection feature in the storage unit 104 and sends a notification to the CFG generation unit 302 to execute processing (step A6).

When the CFG generation unit 302 receives the notification from the tamper detection feature embedding unit 304, it reads the source code with embedded tamper detection feature generated in step A6 from the storage unit 104, and builds it. Furthermore, the CFG generation unit 302 stores the binary with embedded tamper detection feature generated by the build in the storage unit 104. Furthermore, the CFG generation unit 302 analyzes the binary with embedded tamper detection feature to generate a CFG, and sends the generated CFG to the allowed list creation unit 103 (step A7).

When the allowed list creation unit 103 receives the CFG generated in step A7 from the CFG generation unit 302, it reads the binary with embedded tamper detection feature from the storage unit 104 based on the received CFG. Furthermore, the allowed list creation unit 103 creates an allowed list based on the CFG and the binary with embedded tamper detection feature. Furthermore, the allowed list creation unit 103 stores the created allowed list in the storage unit 104 and sends a notification to the input/output unit 301 to execute processing (step A8). In step A8, the same operation as in FIG. 5 described above in the first example embodiment may be executed.

When the input/output unit 301 receives the notification from the allowed list creation unit 103, it reads from the storage unit 104 the binary with embedded tamper detection feature generated in step A7 and the allowed list created in step A8, and outputs the read binary with embedded tamper detection feature and the allowed list (step A9).

[Effects of Third Example Embodiment]

Next, the effects of the monitoring range determination device 300 according to the third example embodiment will be described.

The third example embodiment includes the tamper detection feature embedding unit 304 that embeds the tamper detection feature and the tamper detection feature calling function in a source code. Therefore, it can execute from embedding the tamper detection feature and the tamper detection feature calling functions to determining the monitoring range for the tamper detection feature calling functions on the CFG.

Other effects of the third example embodiment are the same as those of the first example embodiment described above.

The third example embodiment is described as a modification of the first example embodiment described above, but the present invention is not limited thereto. The third example embodiment may be an example of the modification of the second example embodiment described above. When the second example embodiment described above is modified, in step A8 in FIG. 13, the same operation as in FIG. 10 described above in the second example embodiment may be executed.

Fourth Example Embodiment

Next, an example of the hardware configuration of a monitoring range determination device 400 according to a fourth example embodiment is described with reference to FIG. 14.

Figure 14:
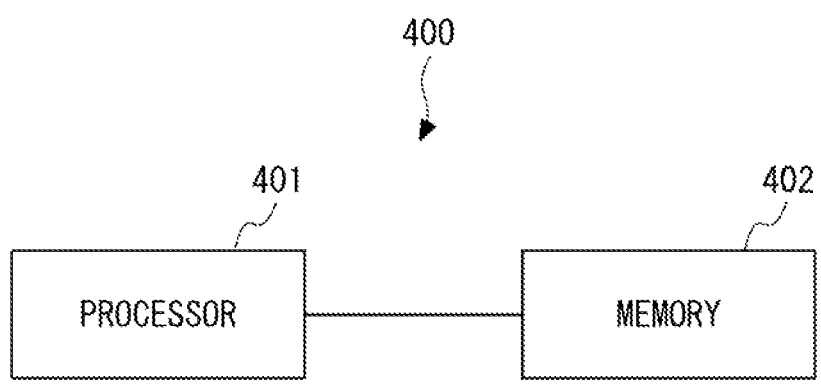
FIG. 14 illustrates an example of the configuration of a monitoring range determination device according to a fourth example embodiment.

Referring to FIG. 14, the monitoring range determination device 400 includes a processor 401 and a memory 402.

The processor 401 may be, for example, a micro processing unit (MPU) or a CPU. The processor 401 may include a plurality of processors. The memory 402 is composed of a combination of a volatile memory and a nonvolatile memory. The memory 402 may include a storage disposed away from the processor 401. In this case, the processor 401 may access the memory 402 via an I/O interface (not illustrated).

Each of the monitoring range determination devices 100, 200, and 300 according to the first, second, and third example embodiments described above may have the hardware configuration illustrated in FIG. 14. In the monitoring range determination devices 100, 200, and 300 according to the first, second, and third example embodiments described above, the input/output units 101 and 301, the CFG generation units 102 and 302, the allowed list creation units 103 and 203, and the tamper detection feature embedding unit 304 may be realized by the processor 401 reading and executing a program stored in the memory 402. In addition, the storage unit 104 of the monitoring range determination devices 100, 200, and 300 according to the first, second, and third example embodiments described above may be realized by the memory 402.

The program can be stored using various types of non-transitory computer readable media and supplied to the monitoring range determination devices 100, 200, and 300. Examples of the non-transitory computer readable media include magnetic recording media (for example, flexible disks, magnetic tapes, or hard disk drives), magneto-optical recording media (for example, magneto-optical disks). Other examples of the non-transitory computer readable medium include a read only memory (CD-ROM), a CD-R, and a CD-R/W. Yet other examples of the non-transitory computer readable media include semiconductor memory. Examples of the semiconductor memory include a mask ROM, a programmable ROM (PROM), an erasable PROM (EPROM), a flash ROM, and a random access memory (RAM). In addition, the program may be supplied to the monitoring range determination devices 100, 200, and 300 by various types of transitory computer readable media. Examples of the transitory computer readable media include electrical signals, optical signals, and electromagnetic waves. The temporary computer readable medium can supply the program to the monitoring range determination devices 100 and 200 via wired communication paths such as electric wires and optical fibers, or wireless communication paths.

The present disclosure has been described above with reference to the example embodiments, but the present disclosure is not limited to the example embodiments described above. Various modifications that could be understood by those skilled in the art can be made to the configuration and details of the present disclosure within the scope of the present disclosure.

For example, the above-described example embodiment assumes that the tamper detection feature to be embedded in the software to be monitored is an allowed list type tamper detection feature using hash values, but the present invention is not limited thereto. For example, the present disclosure is applicable to any tamper detection feature, as long as it is configured to compare the information in the memory of a device in operation with the information in the memory of a device in normal operation, and monitor for tampering based on the results of that comparison.

REFERENCE SIGNS LIST

100 MONITORING RANGE DETERMINATION DEVICE
101 INPUT/OUTPUT UNIT
102 CFG GENERATION UNIT
103 ALLOWED LIST CREATION UNIT
104 STORAGE UNIT
200 MONITORING RANGE DETERMINATION DEVICE
203 ALLOWED LIST CREATION UNIT
300 MONITORING RANGE DETERMINATION DEVICE
301 INPUT/OUTPUT UNIT
302 CFG GENERATION UNIT
304 TAMPER DETECTION FEATURE EMBEDDING UNIT
400 MONITORING RANGE DETERMINATION DEVICE
401 PROCESSOR
402 MEMORY

What is claimed is:

1. A monitoring range determination device configured to determine a monitoring range for tamper detection feature calling functions that are embedded with a tamper detection feature in software to be monitored, the monitoring range determination device comprising:
   at least one memory storing instructions; and
   at least one processor configured to execute the instructions to:
   receive input of a binary of the software in which the tamper detection feature and the tamper detection feature calling functions are embedded;
   generate a control flow graph (CFG) based on the binary; and
   determine the monitoring range for the tamper detection feature calling functions based on the CFG,
   wherein the at least one processor is further configured to execute the instructions to
   sequentially select the tamper detection feature calling functions on the CFG;
   add a node to the monitoring range for the selected tamper detection feature calling functions according to a predetermined rule; and
   search for the tamper detection feature calling function that is to be executed next to the added node according to the predetermined rule, and add the tamper detection feature calling function that is found to the monitoring range for the selected tamper detection feature calling functions,
   wherein the predetermined rule is a rule that traces nodes that do not contain the tamper detection feature calling functions among all descendant nodes of a node containing the selected tamper detection feature calling functions, and adds the range from the node containing the selected tamper detection feature calling functions to a node immediately before the next node containing the tamper detection feature calling functions to the monitoring range for the selected tamper detection feature calling functions.

2. The monitoring range determination device according to claim 1, wherein upon finding a node that has not been added to the monitoring range for any of the tamper detection feature calling functions on the CFG before finding the tamper detection feature calling function that is to be executed next after the node added according to the predetermined rule, the at least one processor is further configured to execute the instructions to add the node that has been found to the monitoring range for the selected tamper detection feature calling functions.

3. The monitoring range determination device according to claim 1, wherein the tamper detection feature is an allowed list type tamper detection feature created as a list of hash values of the monitoring range for the tamper detection feature calling functions.

4. A monitoring range determination method performed by a monitoring range determination device configured to determine a monitoring range for tamper detection feature calling functions that are embedded with a tamper detection feature in a software to be monitored, the monitoring range determination method comprising:
 inputting a binary of the software in which the tamper detection feature and the tamper detection feature calling functions are embedded;
 generating a control flow graph (CFG) based on the binary; and
 a monitoring range determination step of determining the monitoring range for the tamper detection feature calling functions based on the CFG,
 wherein the monitoring range determination method includes
 sequentially selecting the tamper detection feature calling functions on the CFG;
 adding a node to the monitoring range for the selected tamper detection feature calling functions according to a predetermined rule; and
 searching for the tamper detection feature calling function that is to be executed next to the added node according to the predetermined rule, and adding the tamper detection feature calling function that is found to the monitoring range for the selected tamper detection feature calling functions,
 wherein the predetermined rule is a rule that traces nodes that do not contain the tamper detection feature calling functions among all descendant nodes of a node containing the selected tamper detection feature calling functions, and adds the range from the node containing the selected tamper detection feature calling functions to a node immediately before the next node containing the tamper detection feature calling functions to the monitoring range for the selected tamper detection feature calling functions.

5. A non-transitory computer readable medium storing a program that executable by a computer to perform processing of determining a monitoring range for tamper detection feature calling functions that are embedded with a tamper detection feature in a software to be monitored, the processing comprising:
 inputting a binary of the software in which the tamper detection feature and the tamper detection feature calling functions are embedded;
 generating a control flow graph (CFG) based on the binary; and
 a monitoring range determination step of determining the monitoring range for the tamper detection feature calling functions based on the CFG,
 wherein the monitoring range determination method includes
 sequentially selecting the tamper detection feature calling functions on the CFG;
 adding a node to the monitoring range for the selected tamper detection feature calling functions according to a predetermined rule; and
 searching for the tamper detection feature calling function that is to be executed next to the added node according to the predetermined rule, and adding the tamper detection feature calling function that is found to the monitoring range for the selected tamper detection feature calling functions,
 wherein the predetermined rule is a rule that traces nodes that do not contain the tamper detection feature calling functions among all descendant nodes of a node containing the selected tamper detection feature calling functions, and adds the range from the node containing the selected tamper detection feature calling functions to a node immediately before the next node containing the tamper detection feature calling functions to the monitoring range for the selected tamper detection feature calling functions.

* * * * *